Feb. 3, 1959  H. E. DALE  2,871,875
VALVE MOUNTING MEANS
Filed Nov. 19, 1956  2 Sheets-Sheet 1

FIG. I

Inventor
HAROLD EDWIN DALE
By Featherstonhaugh & Co.
Att'ys

Feb. 3, 1959  H. E. DALE  2,871,875
VALVE MOUNTING MEANS
Filed Nov. 19, 1956  2 Sheets-Sheet 2

Inventor
HAROLD EDWIN DALE
By Featherstonhaugh & Co.
Att'ys

United States Patent Office 2,871,875
Patented Feb. 3, 1959

2,871,875

VALVE MOUNTING MEANS

Harold E. Dale, Toronto, Ontario, Canada

Application November 19, 1956, Serial No. 623,189

4 Claims. (Cl. 137—433)

This invention relates to a valve and more particularly to a valve equipped with advantageous mounting means whereby the valve assembly may be mounted on the inner surface of a straight extent of pipe.

The invention is of particular use with float valves in drains and outlets to sewers, where it is desired to prevent the back up of water during storm or flood. The float valve for such purpose is so constructed as to allow passage of water in the normal direction but to float upwardly and block the port on any tendency of the water to reverse its flow. Such valves have in the past required a complicated packing and mounting means, which required modification of the pipe in which they were installed, or a special pipe, in addition to a complicated and expensive installation operation.

This invention provides means for mounting a valve assembly easily and rigidly in the pipe. There are also provided a valve assembly adapted to be so mounted and means in such valve assembly for sealing spaces between said assembly and said pipe. The assembly includes a mounting ring having a surface which is relatively accessible when the assembly is installed in a pipe and a surface slidable on the inner pipe walls. A member adjustable from said accessible surface is adapted when adjusted to move with a component of movement along the axis of such pipe and a member in wedging contact with said first member is adapted to project from said slidable surface to bear on the inner walls of said pipe when said adjustable member is so moved. By providing a plurality of such member combinations, preferably four, the valve assembly may be firmly mounted in the pipe and such firm mounting may be achieved without cracking the pipe wall.

In drawings which illustrate an embodiment of the invention:

Figure 1:
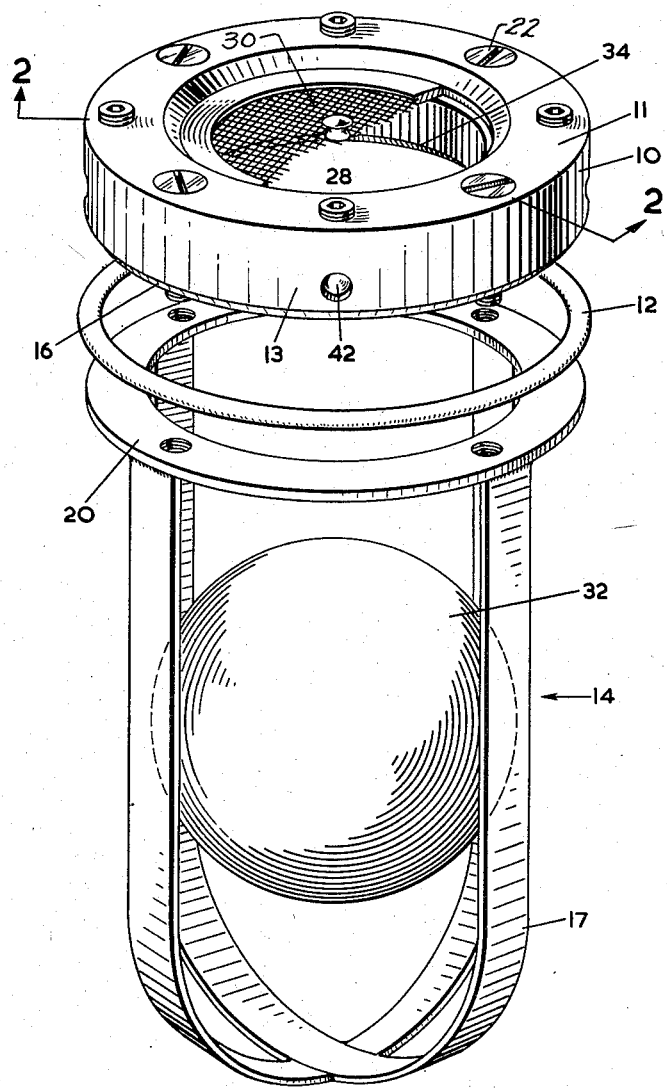
Figure 1 shows a perspective of the valve.
Figure 2:
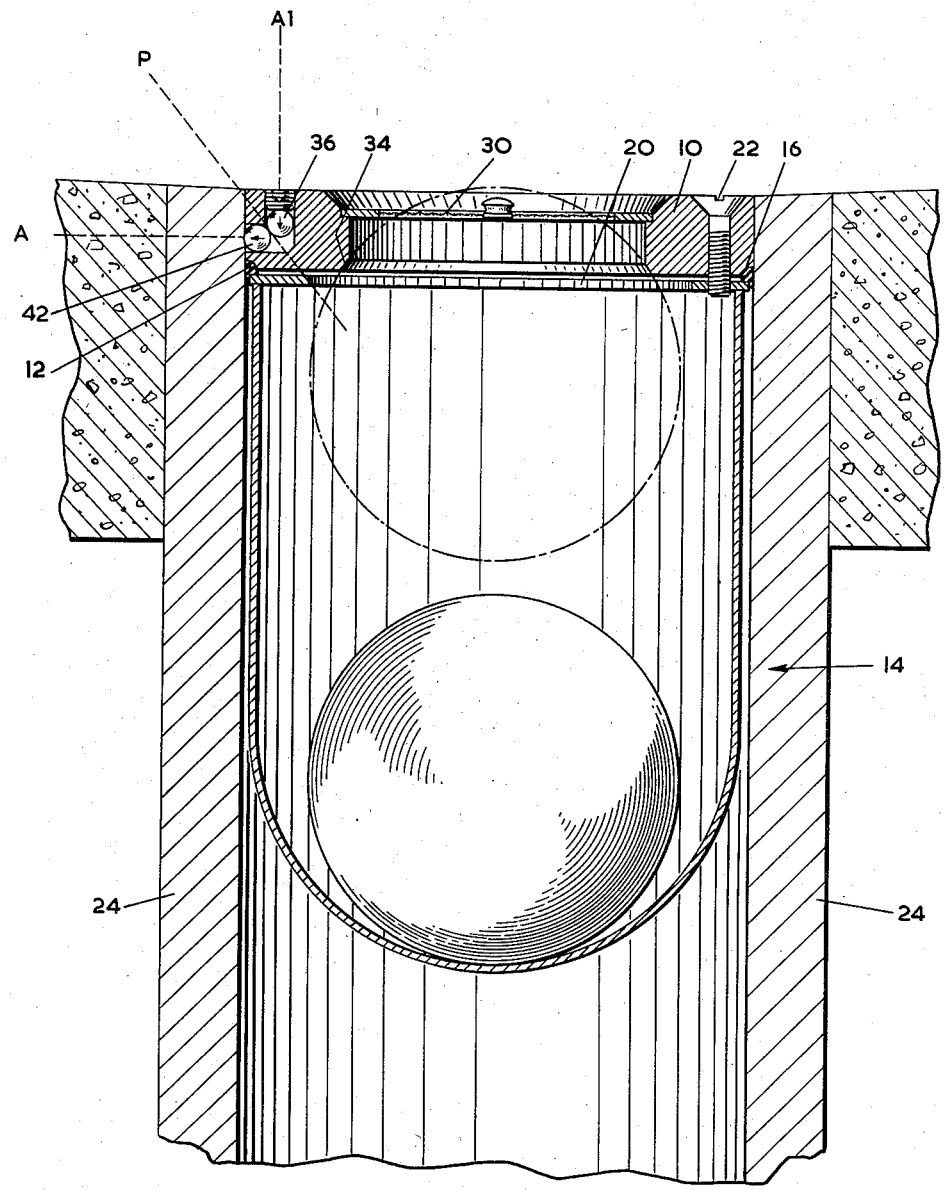
Figure 2 shows a cross-section taken along the lines 2—2 of Figure 1.

In the drawings a float valve assembly comprises a mounting ring 10, a packing ring 12 and a ball and cage assembly 14. The mounting ring 10 has a top surface 11 accessible when the assembly is installed in a pipe and a surface 13 slidable along such inner pipe walls. A main port 28 is the fluid passageway of the valve and the port 28 is provided with a removable grill 30 which may be removed for cleaning as to allow access to the ball and cage assembly 14. The lower, outer periphery of the mounting ring 10 is provided with a concave outward groove 16 for seating the packing material comprising ring 12. The ball and cage assembly 14 comprises a ball 32, a cage 17 and a cage ring 20.

Adjustable bolts 22 threaded to the mounting ring 10 and to the cage ring 20 are adapted to draw the two rings 12—20 together.

The packing material comprising ring 12 is resilient so as to conform under compressive pressure to the concave outward groove 16 and under such compressive pressure between the two rings to bulge outwardly to bear against the inner wall of a pipe such as the pipe 24 and thus to seal the spaces around the valve. The lower edge of mounting ring 10 bordering the main port, is provided with a chamfered surface 34 adapted to conform to the contour of the ball 32 so as to provide a proper valve seat.

This being the float valve assembly, the invention provides a means for seating such assembly comprising: a number of: means operable from the accessible surface of the mounting ring adapted to move in a direction having a component along the axis of the pipe 24 which is adapted to apply a wedging pressure to an element adapted under such wedging pressure to project outwardly from the slidable surface 13 to bear against the inner surface of pipe 24.

In a preferred embodiment of the invention a means adjustable with components of axial movement are embodied in a steel ball 36 actuable in the "upright" extent of a L-shaped passage 40 by a threaded bolt 38 mounted in the opening of the passage 40 to the surface 11.

The "cross-bar" extent of the L-shaped passage is open to the slidable surface 13 of the ring 10 and the element adapted to be biased to project outwardly from the slidable surface 13 to bear against the inner surface of pipe 24 is here embodied in a ball 42 contained in the portion of the passage.

The dimensions of the L-shaped passage 40 and of the balls 36 and 42 are such that the balls will just slide easily in the passage and the dimensions of these elements are such that when the side-exposed surface of the ball 42 is co-tangential with the exterior of mounting ring 10, it will project sufficiently into the upward extent of passage 40 to support ball 36 at a point of contact on a tangent plane $p$ sloping between the smaller angle between the axes A, A of the "upright" and the "cross-bar" extents respectively of the L-shaped passage. In operation, then, the mounting ring 10 with the bolts 22 rather loosely connecting it to the cage ring 20 is held manually in position in the pipeway and the ball-operating bolts 38 are then tightened with each bolt forcing a ball 36 downward in its respective L-shaped passage 40 to press on and bias the balls 42 outwardly into clamping relation with the pipe 24.

The valve assembly as a whole will thus be suspended in place. In order to properly seal the junction between the mounting ring 10 and the inner surface of the pipe 24, the bolts 22 are tightened drawing the cage ring 20 toward the mounting ring 10 and so bearing on the packing material 12 as to bulge it outwardly and into sealing contact with said inner surface.

There has therefore been developed a means for mounting such a valve assembly in a pipe which does not require special fitting means, or special pipe shaping but may be fitted into the regular contour of the pipe. Moreover, it has been found that the firm anchoring of the assembly in the pipe may be obtained by this means without cracking the pipe.

What I claim as my invention is:

1. Means for mounting, in a pipe, a float valve assembly having a mounting ring comprising a L-shaped passage in such mounting ring, said passage being open to an accessible surface of such ring and to a side wall of said ring which is slidable on the inner pipe surface, a ball located in the passage extending toward said pipe surface and a ball located in the passage extending from said upper surface and supported by said first mentioned ball at a point on said first mentioned ball remote from the pipe surface and above the centre line of said first mentioned ball, threading in the upper extremity of the passage adjacent the upper surface and a bolt threaded therein adapted to bear on said second mentioned ball.

2. In apparatus as claimed in claim 1 wherein said mounting ring is connected to a second ring and adjustably spaced therefrom and a ring of sealing material is provided adapted to be compressed between said rings and when so compressed to contact said pipe surface.

3. Means for mounting a valve assembly in a pipe, said mounting means including a mounting ring having an accessible surface and a surface slidable on the inner surface of said pipe, an L-shaped passage having a first extent of said L open to said accessible surface and a second extent open to said slidable surface a first ball contained in said first extent, and a second ball contained in said second extent, said passage and said balls being of such dimensions that said balls will just slide easily in said passage and of such dimensions that when the exposed surface of said second ball is cotangential with said slidable surface said second ball will project sufficiently into said passage to support said first mentioned ball at a point of contact along a tangent plane lying between the smaller angle between the two extents, and means for actuating said first ball along said passage.

4. In apparatus as claimed in claim 3, wherein said mounting ring is connected to a second ring, and adjustably spaced therefrom, and a ring of sealing material provided, adapted to be compressed between said rings and when compressed to contact the pipe wall.

References Cited in the file of this patent
UNITED STATES PATENTS

| | | |
|---|---|---|
| 522,750 | Brown | July 10, 1894 |
| 1,753,724 | Shaw | Apr. 8, 1930 |
| 2,747,899 | Wiltse | May 29, 1956 |